United States Patent
Lee et al.

(10) Patent No.: US 6,831,121 B2
(45) Date of Patent: Dec. 14, 2004

(54) TRIMETHYLOLPROPANE ESTER-BASED PLASTICIZER COMPOSITION FOR POLYVINYL CHLORIDE RESIN

(75) Inventors: Kye-Seok Lee, Daejeon (KR); Kyu-Il Lee, Daejeon (KR); Hyun-Kyu Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 145 days.

(21) Appl. No.: 10/204,621

(22) PCT Filed: Dec. 7, 2001

(86) PCT No.: PCT/KR01/02127

§ 371 (c)(1),
(2), (4) Date: Aug. 22, 2002

(87) PCT Pub. No.: WO02/053635

PCT Pub. Date: Jul. 11, 2002

(65) Prior Publication Data

US 2003/0065073 A1 Apr. 3, 2003

(30) Foreign Application Priority Data

Jan. 5, 2001 (KR) .................................. 2001-0000655

(51) Int. Cl.$^7$ .................................................. C08K 5/11
(52) U.S. Cl. ........................ 524/311; 524/293; 524/569; 554/227; 560/112; 560/263; 252/182.28
(58) Field of Search ................................ 524/293, 311, 524/569; 554/227; 560/112, 263; 252/182.28

(56) References Cited

U.S. PATENT DOCUMENTS

| | | | |
|---|---|---|---|
| 3,939,201 A | | 2/1976 | Bacskai |
| 3,970,631 A | * | 7/1976 | Bacskai ...................... 524/311 |
| 5,114,506 A | | 5/1992 | Consaga et al. |
| 5,470,497 A | | 11/1995 | Schlosberg et al. |

FOREIGN PATENT DOCUMENTS

| | | |
|---|---|---|
| JP | 62-63547 A | 3/1987 |
| JP | 06-025474 A | 2/1994 |

* cited by examiner

*Primary Examiner*—Peter Szekely
(74) *Attorney, Agent, or Firm*—Birch, Stewart, Kolasch & Birch, LLP

(57) ABSTRACT

The present invention relates to a trimethylolpropane ester-based plasticizer composition for polyvinyl chloride resin, more particularly a plasticizer composition comprising trimethylolpropane ester capable of using as plasticizer of polyvinyl chloride resin. The present invention can prepare polyvinyl chloride resin having superior tensile strength, elongation, migration, and sheet heating loss etc. by using the plasticizer composition.

7 Claims, No Drawings

TRIMETHYLOLPROPANE ESTER-BASED PLASTICIZER COMPOSITION FOR POLYVINYL CHLORIDE RESIN

This application is the national phase under 35 U.S.C. §371 of PCT International Application No. PCT/KR01/02127 which has an International filing date of Dec. 7, 2001, which designated the United States of America, and which claims priority to Korean Application 2001-00006555, filed Jan. 5, 2001 under 35 U.S.C. §119.

BACKGROUND OF THE INVENTION (a) Field of the Invention

The present invention relates to a trimethylolpropane ester-based plasticizer composition, and more particularly to a trimethylolpropane ester-based plasticizer composition used as a plasticizer when preparing polyvinyl chloride resin.

(b) Description of the Related Art

Polyvinyl chloride (PVC) is a general resin that can attain various physical processing properties by suitably mixing additives such as stabilizers, fillers, pigments, and plasticizers. Polyvinyl chloride with the various physical processing properties is widely used as a material for goods such as wallpaper, gloves, and toys, as well as for pipe, electric wire insulation, and artificial leather. The plasticizer is an essential additive for preparation of polyvinyl chloride resin, to impart various physical properties such as processability, flexibility, electric insulating ability, etc.

The representative plasticizers used in processing of polyvinyl chloride resin include phthalate-based plasticizers, adipate-based plasticizers, and trimellitate-based plasticizers, etc. The most generally used plasticizer, di-2-ethylhexylphthalate (DEHP), is phthalate-based, and it plays a role as a standard plasticizer for performance evaluation of other plasticizers.

On the other hand, trimethylolpropane ester is mainly a well-miscible lubricant for refrigerants, (U.S. Pat. No. 5,470,497), and it is also used as an additive for lubricating oil in automobile engines (U.S. Pat. No. 4,061,581). Furthermore, trimethylolpropane ester can effectively remove precipitation materials from metal surfaces in engine parts of automobiles (Japanese Patent Laid-open Publication No. Heisei 5093191 A2), and an ester prepared by synthesis of trimethylolpropane and fatty acids improves friction resistance of a road surface without reduction of friction resistance of a wet road (Japanese Patent Laid-open Publication No. Heisei 1113444 A2).

Although the trimethylolpropane ester is used as an additive for lubrication as mentioned above, it has structurally weak physical properties compared with phthalate-based and trimellitate-based plasticizers widely used in the related art, and thus it is not used as a plasticizer when processing polyvinyl chloride.

For example, as a plasticizer used in processing of polyvinyl chloride resin, trimethylolpropane ester comprises mono-component esters each synthesized by adding hexane or 2-ethylhexanoic acid as an acid of an aliphatic group series, or benzoic acid as an acid of an aromatic group series, to trimethylolpropane as a triply-charged alcohol.

In addition, triethanolmethane ester is a plasticizer having physical properties superior to trimethylolpropane ester or other plasticizers. The trimethylolpropane ester was inferior in physical properties, as mentioned, as the ester of the mono component has too many weak bonds to play a role as a plasticizer, even in the case when compatibility with polyvinyl chloride resin does not exist (U.S. Pat. No. 3,939,201).

SUMMARY OF THE INVENTION

It is an object of the present invention to provide a trimethylolpropane ester-based multi-component synthesized plasticizer composition by adding benzoic acid as an aromatic acid and aliphatic mono-carboxylic acid with 3 to 10 saturated linear or branched carbon atoms to trimethylolpropane as a triply-charged alcohol so that a polyvinyl chloride resin body having superior tensile strength, elongation, migration resistance, and sheet heating loss etc. can be prepared by using it as a plasticizer during polyvinyl chloride resin processing.

In order to achieve the object, the present invention provides a plasticizer composition comprising trimethylolpropane ester shown in the following Formula 1:

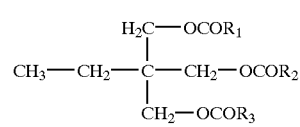

[Formula 1]

wherein $R_1$, $R_2$, and $R_3$ are a phenyl group or an alkyl group with 3 to 10 and preferably 4 to 5 carbon atoms, respectively.

Furthermore, the present invention provides a polyvinyl chloride resin body comprising the plasticizer composition.

DETAILED DESCRIPTION OF THE PREFERRED EMBODIMENTS

The present invention is described in detail as follows.

The mixture of trimethylolpropane (TMP) ester of the present invention comprises a) trimethylolpropane-tri-(2-ethyl hexanoate), b) benzoic acid 2,2-bis-(2-ethyl-hexanoyloxymethyl)-butyl ester, c) 2-ethylhexanoic acid 2,2-bis-(benzoyloxymethyl)-butyl ester, and d) trimethylol propane-tri-benzoate. That is, the 4 different kinds of ester in the trimethylolpropane ester compound shown in the above Formula 1.

The trimethylolpropane ester plasticizer composition of the present invention, used in processing of polyvinyl chloride resin having superior physical processing properties such as compatibility, migration resistance, etc., is prepared by adding benzoic acid and 2-ethylhexanoic acid as raw materials to trimethylolpropane.

The mixture comprises 5 to 60 wt % of trimethylolpropane-tri-(2-ethyl hexanoate), 20 to 70 wt % of benzoic acid 2,2-bis-(2-ethyl-hexanoyloxymethyl)-butyl ester, 5 to 50 wt % of 2-ethylhexanoic acid 2,2-bis-(benzoyloxymethyl)-butyl ester, and 1 to 30 wt % of trimethylol propane-tri-benzoate; and more preferably comprises 15 to 40 wt % of trimethylolpropane-tri-(2-ethyl hexanoate), 4.0 to 50 wt % of benzoic acid 2,2-bis-(2-ethyl-hexanoyloxymethyl)-butyl ester, 15 to 35 wt % of 2-ethylhexanoic acid 2,2-bis-(benzoyloxymethyl)-butyl ester, and 1 to 10 wt % of trimethylol propane-tri-benzoate.

When the mixture of trimethylolpropane ester of the present invention is processed with polyvinyl chloride, the physical properties thereof are at least equal to physical properties of the prior art, and particularly sheet volatile loss and migration resistance are superior when compared with DEHP used as a standard plasticizer.

Trimethanolpropane ester of mono-component no multi-component, for example in the case of ester synthesized by adding only lauric acid as an aliphatic acid with 12 carbon atoms to trimethylolpropane, is difficult to use as a plasticizer due to its non-compatibility with polyvinyl chloride. In the case of ester synthesized is by adding only 2-ethylhexanoic acid to trimethylolpropane, it has compatibility, but migration resistance is poor and flowing out the processed sheet surface is problematic.

On the other hand, in the case of a multi-component trimethylolpropane ester, different physical properties are shown depending on kinds of alcohol and carboxylic acid used. That is, a multi-component ester synthesized by using trimethylolpropane and lauric acid and 2-ethylhexanoic acids as raw materials is not compatible with polyvinyl chloride resin, in the same way as a case of adding only lauric acid to trimethylolpropane for synthesis. If the ester synthesizes by simultaneously adding 2-ethylhexanoic acid and acetic acid to trimethylolpropane, 24 hrs after the specimen production flowing the plasticizer out of the specimen becomes problematic, since compatibility is superior but migration resistance falls.

As mentioned, with both multi-component trimethylolpropane ester and mono-component trimethanolpropane ester, selective synthesis of acid and alcohol is very important because it is hard to produce all the desired physical properties such as compatibility, migration resistance etc. with polyvinyl chloride resin.

Furthermore, in the case of migration resistance, generally there is an effect on the structure of ester materials or the outside environment. A plasticizer having a high molecular weight has excellent migration resistance of more than a plasticizer having a low molecular weight among the structure of ester materials.

Therefore, the multi-component trimethylolpropane ester mixture according to the present invention prepares a suitable composition as aforementioned, by adding suitable acids and alcohol as raw materials, namely 2-ethylhexanoic acid-as the aliphatic acid and benzoic acid as the aromatic acid, to trimethylolpropane.

The plasticizer composition comprising trimethylolpropane ester of the present invention is prepared by the following method.

In concrete terms, in order to prepare a plasticizer composition comprising trimethylolpropane ester comprising a) 5 to 60 wt % of trimethylolpropane tri 2-ethylhexanoate, b) 20 to 70 wt % of benzoic acid 2,2-bis 2-ehtylhexanoyloxymethyl butyl ester, c) 5 to 50 wt % of 2-ethylhexanoic acid 2,2-bis benzoyloxymethyl butyl ester, and d) 1 to 30 wt % of trimethylpropane tribenzoate, i) 10 to 30 wt % of trimethylolpropane, ii) 20 to 70 wt % of 2-ethylhexanoic acid, iii) 10 to 60 wt % of benzoic acid, iv) 1 to 10 wt % of xylene, and v) 0.05 to 1 wt % of tetraisopropyltitanate are added to a flask equipped with a stirrer and condenser, the mixture is reacted for 4 to 20 hrs at 220° C., and un-reacted acid is removed through decompressing with a vacuum pump. The reactant is neutralized with 5 to 15 wt % of sodium hydroxide and washed, and then adsorbent is added to the reactant to remove water by hydrating under vacuum, followed by filtering.

In the process, xylene is an entrainer, and tetraisopropyltitanate plays the part of a catalyst.

The present invention provides a polyvinyl chloride resin body having excellent tensile strength, elongation, migration resistance, and sheet heating loss etc. using the trimethylolpropane ester composition as a plasticizer.

Hereinafter, the present invention is described in more detail through the following EXAMPLES and COMPARATIVE EXAMPLES. However, the following EXAMPLES are only for the understanding of the present invention, and the present invention is not limited to the following EXAMPLES.

EXAMPLES

Example 1
(Preparation of Plasticizer Composition Comprising Trimethyloipropane Ester)

To a 2 l, 4-neck round flask equipped with a stirrer and a condenser, 268.36 g of trimethylolpropane, 576.84 g of 2-ethylhexanoic acid, 366.39 g of benzoic acid, 50 g of xylene as an entrainer material, and 2.83 g of tetraisopropyltitanate as a catalyst were added, and the reaction was performed for 10 hrs by raising the temperature of the mixture to 220° C.

After reaction, un-reacted acid was removed by evacuating the flask to 2 mmHg with a vacuum pump at 200° C., and the flask contents were neutralized with 5 wt % of sodium hydroxide and a washing and drying process was performed, and then the trimethylolpropane ester mixture was obtained by adding absorbent to the resultant and filtering.

(Method for Processing of Polyvinyl Chloride)

In order to measure physical properties of the trimethylolpropane ester mixture obtained, the specimen was prepared to ASTM D638 standard. That is, 60 phr of the obtained trimethylolpropane ester plasticizer mixture, 3 phr of calcium-zinc stabilizer (LTX-620S, product of KOREA DAEHYUP CHEMICAL CO., LTD), and 0.2 phr of stearic acid was mixed with polyvinyl chloride resin (LS100, product of LG. CHEMICAL CO., LTD), and a 5 mm sheet was prepared with a working roll mill over 3 min at 165° C. Thereafter a press operation was performed preheating for 3 min, heating for 3 min, and cooling for 3 min at 185° C., and then a 1 mm sheet was fabricated to prepare a plurality of dumbbell-shaped type C samples.

(Experiment of Physical Properties)

The specimen prepared by the method was pulled cross head speed by 500 mm/min through the ASTM D638 method (That is, U.T.M as a test instrument), and then tensile strength and elongation was measured at a place on cutting the specimen. Tensile strength ($kgf/mm^2$) was calculated as load value(kgf)/thickness(mm)×width(mm), and elongation(%) was calculated as extension/initial length× 100.

Needle of hardness experimental instrument (C type) was got down perfectly, and then the hardness value was read shown after 10 sec. The hardness was measured by the average value testing at 5 positions for each specimen.

Sheet heating loss was calculated by measuring initial weight (Wi) to the forth decimal place for each specimen, and then fixing the specimens in an oven at 130° C. using a clamp. Thereafter the specimen was stored for 4 hrs or more in thermostat by taking out after 3 hrs, and the specimen weights (Wo) were measured, and then sheet heating loss was calculated by Equation 1 below.

$$\text{Heating loss} = \frac{(Wi - Wo)}{Wi} \times 100 \quad \text{[Equation 1]}$$

Migration resistance was calculated by measuring initial weight(Wi) to the forth decimal place for each specimen, and each specimen sheet (3 cm×3 cm) was placed between polystyrene (PS) plates in an oven at 80° C. and left for 48 hrs under a pressure of 1 kg. Thereafter the specimen was stored for 4 hrs or more in thermostat by taking out at oven, and the specimen weights (Wo) were measured, and migration resistance was calculated by Equation 2 below.

$$\text{Migration rate} = \frac{(Wi - Wo)}{Wi} \times 100 \quad \text{[Equation 2]}$$

Static heat-resistance was measured using a Mathis oven. A specimen of 40 cm×2 cm was introduced into the oven at 195° C., it was removed in 30 mm increments at 3-minutes intervals, and appearance changes such as color at each interval were evaluated based on DEHP used as the standard plasticizer. Results of the physical properties measured by the method are shown in Table 2.

Example 2

The trimethylolpropane ester and the specimen were prepared by the same method as in Example 1, except that materials and amounts were as shown in Table 1 below, and the results of physical property measurements are shown in Table 2 below.

The composition ratio of the ester mixture was 25.65 wt % of trimethyloipropane tri-2-ethylhexanoate, 44.72 wt % of benzoic acid 2,2-bis 2-ethylhexanoyloxymethyl butyl ester, 24.05 wt % of 2-ethylhexanoic acid 2,2-bis benzoyloxymethyl butyl ester, 3.47 wt % of trimethylolpropane tribenzoate, and 211 wt % of other components.

Example 3

The trimethylolpropane ester and the specimen were prepared by the same method as in Example 1, except that materials and amounts were as shown in Table 1 below, and the results of physical property measurements are shown in Table 2 below. The composition ratio of the ester mixture was 34.51 wt % of trimethylolpropane tri-2-ethylhexanoate, 44.56 wt % of benzoic acid 2,2-bis 2-ethylhexanoyloxymethyl butyl ester, 17.52 wt % of 2-ethylhexanoic acid 2,2-bis benzoyloxymethyl butyl ester, 1.38 wt % of trimethyloipropane tribenzoate, and 2.03 wt % of other components.

Comparative Example 1

The trimethyloipropane ester and the specimen were prepared by the same method as in Example 1, except that the most widely used plasticizer, di-2-ethylhexylphthalate (DHEP, product of LG. CHEMICAL CO., LTD) was used, and the measured physical property results are shown in Table 2.

Comparative Example 2

The trimethylolpropane tri-2-ethylhexanoate and the specimen were prepared by the same method as in Example 1, except that materials and amounts were as shown in Table 1 below, and the results of physical property measurements are shown in Table 2 below.

Comparative Example 3

The trimethylol propane-tri-laurate and the specimen were prepared by the same method as in Example 1, except that materials and amounts were as shown in Table 1 below, and the results of physical property measurements are shown in Table 2 below.

Comparative Example 4

The trimethylolpropane ester mixture and the specimen were prepared by the same method as in Example 1, except that materials and amounts were as shown in Table 1 below, and the results of physical property measurements are shown in Table 2 below.

Comparative Example 5

The trimethylolpropane ester mixture and the specimen were prepared by the same method as in Example 1, except that materials and amounts were as shown in Table 1 below, and the results of physical property measurements are shown in Table 2 below.

TABLE 1

| Division (g(mole)) | Example | | | Com. Example | | | |
|---|---|---|---|---|---|---|---|
| | 1 | 2 | 3 | 2 | 3 | 4 | 5 |
| Material of ester | | | | | | | |
| Trimethylol propane | 268.36 (2) | 268.36 (2) | 268.36 (2) | 268.36 (2) | 268.36 (2) | 268.36 (2) | 268.36 (2) |
| 2-ethylhexanoic acid | 576.84 (4) | 663.37 (4.6) | 721.05 (5) | 951.80 (6.6) | — | 634.50 (4.4) | — |
| Benzoic acid | 366.39 (3) | 293.09 (2.4) | 244.26 (2) | — | — | — | — |
| Lauric acid | — | — | — | — | 1442.2 (7.2) | 440.70 (2.2) | 661.10 (3.3) |
| Acetic acid | — | — | — | — | — | — | 336.90 (3.3) |
| Xylene | 50 | 50 | 50 | 50 | 50 | 50 | 50 |
| Tetraisopropyl-titanate | 2.83 | 2.39 | 2.90 | 2.85 | 3.61 | 2.15 | 3.00 |

Comparative Example 1 used di-2-ethylhexylphthalate (DHEP, products of LG. CHEMICAL CO., LTD) as a plasticizer.

TABLE 2

| Division | Example 1 | Example 2 | Example 3 | Com. Example 1 | Com. Example 2 | Com. Example 3 | Com. Example 4 | Com. Example 5 |
|---|---|---|---|---|---|---|---|---|
| Tensile strength (kgf/mm$^2$) | 2.20 | 1.90 | 1.85 | 1.75 | 1.87 | 1.70 | No common property | No common property |
| Elongation (%) | 363 | 350 | 343 | 378 | 390 | 400 | | |
| Migration resistance (%) | 2.32 | 3.15 | 3.61 | 3.95 | 5.12 | 6.53 | | |
| Hardness | 84 | 82 | 83 | 78 | 84 | 80 | | |
| Sheet heating loss (%) | 2.25 | 2.57 | 2.78 | 7.24 | 4.45 | 4.26 | | |
| Static heat-resistance | equality | equality | equality | standard | equality | inferiority | | |

As can be seen in Tables 1 and 2, Examples 1 to 3 that were synthesized using trimethylolpropane, 2-ethylhexanoic acid, and benzoic acid as raw materials were equal in static heat-resistance, and they showed superior physical properties in tensile strength, migration resistance, and sheet heating loss etc. compared with di-2-ethylhexylphthalate (Comparative Example 1) used in the standard plasticizer.

In addition, the mono-component ester synthesized by adding only 2-ethylhexanoic acid to trimethylolpropane (Comparative Example 2) and the mono-component ester synthesized by adding only lauric acid to trimethylolpropane (Comparative Example 3) had compatibility, but a problem of bad migration resistance etc. occurred.

Furthermore, the ester synthesized by adding 2-ethylhexanoic acid and lauric acid with 12 carbon atoms as aliphatic acid to trimethylolpropane (Comparative Example 4) and the ester synthesized by adding lauric acid with 12 carbon atoms as aliphatic acid and acetic acid to trimethylolpropane (Comparative Example 5) were difficult to use as plasticizers due to lack of compatibility with polyvinyl chloride.

As can be seen in the experimental results, when multi-component polyvinyl chloride resin was processed, in the case of the multi-component trimethylolpropane ester mixture as a plasticizer, namely the ester synthesized as a composition of trimethylolpropane, 2-ethylhexanoic acid, and benzoic acid, a polyvinyl resin body can be prepared having excellent physical properties.

The present invention can prepare polyvinyl chloride resin having superior tensile strength, elongation, migration, and sheet heating loss etc. by using the plasticizer composition.

What is claimed is:

1. A plasticizer composition, comprising:
   a) trimethylolpropane-tri-2-ethyl hexanoate;
   b) benzoic acid 2,2-bis-(2-ethyl-hexanoyloxymethyl)-butyl ester;
   c) 2-ethyl hexanoic acid 2,2-bis-(benzoyloxymethyl)-butyl ester; and
   d) trimethylolpropane-tri-benzoate.

2. The composition according to claim 1, wherein the composition comprises:
   a) 5 to 60 wt % of trimethylolpropane-tri-2-ethyl hexanoate;
   b) 20 to 70 wt % of benzoic acid 2,2-bis-(2-ethyl-hexanoyloxymethyl)-butyl ester;
   c) 5 to 50 wt % of 2-ethyl hexanoic acid 2,2-bis-(benzoyloxymethyl)-butyl ester; and
   d) 1 to 30 wt % of trimethylolpropane-tri-benzoate.

3. The composition according to claim 1, wherein the composition comprises:
   a) 15 to 40 wt % of trimethylolpropane-tri-2-ethyl hexanoate;
   b) 40 to 50 wt % of benzoic acid 2,2-bis-(2-ethyl-hexanoyloxymethyl)-butyl ester;
   c) 15 to 35 wt % of 2-ethyl hexanoic acid 2,2-bis-(benzoyloxymethyl)-butyl ester; and
   d) 1 to 10 wt % of trimethylolpropane-tri-benzoate.

4. The composition according to claim 1, wherein the composition is prepared by a method comprising steps of reacting:
   i) 10 to 30 wt % of trimethylolpropane;
   ii) 20 to 70 wt % of 2-ethylhexanoic acid;
   iii) 10 to 60 wt % of benzoic acid;
   iv) 1 to 10 wt % of xylene; and
   v) 0.01 to 1 wt % of tetraisopropyltitanate for 4 to 20 hrs. at 220° C.

5. The composition according to claim 1, wherein the composition is prepared by a method comprising steps of reacting:
   i) 15 to 25 wt % of trimethylolpropane;
   ii) 35 to 65 wt % of 2-ethylhexanoic acid;
   iii) 10 to 40 wt % of benzoic acid;
   iv) 2 to 7 wt % of xylene; and
   v) 0.01 to 0.7 wt % of tetraisopropyltitanate for 4 to 20 hrs. at 220° C.

6. A polyvinyl chloride resin body comprising:
   polyvinyl chloride; and
   the composition according to claim 1.

7. A polyvinyl chloride resin body comprising:
   polyvinyl chloride; and
   the composition according to claim 4.

* * * * *